United States Patent
Cain et al.

(10) Patent No.: US 6,277,430 B1
(45) Date of Patent: Aug. 21, 2001

(54) FAT EMULSIONS

(75) Inventors: Frederick William Cain, Wormerveer (NL); Anne Hailes, Sharnbrook (GB); Leo Frans Vermaas, Vlaardingen; Olga Cornelia Zwemmer, Wormerveer, both of (NL)

(73) Assignee: Unilever Patent Holdings B.V., Vlaardingen (NL)

( * ) Notice: Subject to any disclaimer, the term of this patent is extended or adjusted under 35 U.S.C. 154(b) by 0 days.

(21) Appl. No.: 09/403,546

(22) PCT Filed: Apr. 2, 1998

(86) PCT No.: PCT/EP98/02135

§ 371 Date: Jan. 27, 2000

§ 102(e) Date: Jan. 27, 2000

(87) PCT Pub. No.: WO98/47385

PCT Pub. Date: Oct. 29, 1998

(30) Foreign Application Priority Data

Apr. 24, 1997 (EP) .................................................. 97302826

(51) Int. Cl.$^7$ .................................................. A23D 9/007
(52) U.S. Cl. ........................... 426/601; 426/602; 426/611
(58) Field of Search ..................................... 426/601, 602, 426/611

(56) References Cited

U.S. PATENT DOCUMENTS

| | | | |
|---|---|---|---|
| 5,085,856 | * 2/1992 | Dunphy | 424/64 |
| 5,843,407 | * 12/1998 | El-Nokaly | 424/64 |
| 6,022,578 | * 2/2000 | Miller | 426/603 |

FOREIGN PATENT DOCUMENTS

| | | |
|---|---|---|
| 654 262 | 5/1995 | (EP) . |
| 1 146 558 | 3/1969 | (GB) . |
| 95 28847 | 11/1995 | (WO) . |

OTHER PUBLICATIONS

Stecher, ed 1968 The Merck Index 8th ed. Merck & Co, Inc Rahway NJ p 123, 124, 607, 615.*
Hui 1996 Bailey's Industrial Oil and Fat Products 5th Edition vol. 2 John Wiley & Sons, Inc New York p 503.*
Database WPI, Section Ch. Week 8950, Derwent Publications Ltd. Class D13, AN 89–367379, XP002073226, & JP 01 274 836.
Database WPI, Section Ch. Week 8618, Derwent Publications Ltd. Class D13, AN 86–117166, XP002042067, & JP 61 258 536.
Patent Abstracts of Japan, vol 112, No 092, (C–483), Mar. 25, 1988, & JP 62 224258, Oct. 2, 1987.
Database WPI, Section Ch. Week 8842, Derwent Publications Ltd. Class D13, AN 88–297717, XP002042066, & JP 63 219357.
Patent Abstracts of Japan, vol 112, No 176, (C–498), May 25, 1988, & JP 62 282545, Dec. 8, 1987.

* cited by examiner

Primary Examiner—Carolyn Paden
(74) Attorney, Agent, or Firm—Pillsbury Winthrop LLP

(57) ABSTRACT

Novel fat-continous emulsion, containing a blend with emulsifying properties is obtained by the blending of: 0–90% of a partial glyceride (=A); 0–80% of a phospholipid (=B); 0.01–99.98% of a long chain alcohol having >20 C-atoms in the alcohol chain, while the amount of (A)+(B) $\geq 0.02\%$ and incorporating this blend in a fat-continuous emulsion.

9 Claims, No Drawings

FAT EMULSIONS

This application is the national phase of international application PCT/EP98/02135 filed Apr. 2, 1998.

FIELD OF THE INVENTION

Food products often contain emulsifying systems. Components for these emulsifying systems can be selected from many sources but often they comprise partial glycerides and phospholipids. Although these emulsifying systems can give good to acceptable results when applied in food products containing a fat emulsion, such as spreads, dressings, mayonnaise, creams etc. we also found that product properties like spreadability, melt down or flavor release still were not optimal. This problem is known for in particular water-in-oil emulsions such as spreads, more particularly low fat spreads, wherein the emulsifier system has a critical role. This is in particular the case in products wherein a component is required that can provide structuring to the food products. Moreover the food products from nowadays need to contain components that make them healthier than the food products known so far.

DESCRIPTION OF RELATED ART

Long chain alcohols are applied in food products such as beverages to improve stability of the beverage emulsion.(cf JP 63/219357). Herefore a water soluble emulsifier should be present in the composition. In this document nothing is disclosed about the use of these compositions in fat continuous emulsions let it be about the improvements in product properties that can be achieved by this use. From JP 62/224258 it is known that nutritive foods can be obtained that contain 5 out of 7 components named per se. One of these components is octacosanol ie a component comprising a long chain alcohol in high amounts. This document however does not disclose the use of the long chain alcohol in fat continuous emulsions neither per se nor combined with other emulsifiers. From JP 61/058536 nutritive food compositions are known that contain high amounts of pine nut oil and polyunsaturated fatty acids such as CLA, EPA and DHA. The compositions also contain a small amount of an oil soluble, physiologically active component, which could be octacosanol (cf claim 4). Although the examples also illustrate the preparation of a margarine the margarine prepared does not contain policosanol. Therefore it cannot be derived from this document that the use of long chain alcohols in fat continuous emulsions has a beneficial effect on product performance.

BRIEF SUMMARY OF THE INVENTION

We studied, whether we could find a new blend with emulsifying properties comprising also a very healthy component that provides structuring properties to fat-continuous emulsions, while also providing simultaneously cholesterol lowering properties to the food products. Although the cholesterol lowering component per se is known for this purpose cf EP 654 262 and WO 94/07830 the positive impact of the component on the structuring properties of fat-continuous systems is not disclosed in these documents. This structuring effect is noticed as a higher hardness for the fat continuous emulsion (Stevens value).

Therefore our invention concerns in the first instance fat-continuous emulsions of fat and water, having a fat content of 0.5–99.5 wt %, preferably 10–90 wt %, most preferably 15–85 wt % and containing an emulsifier system, wherein the emulsifier system is a blend of components, with emulsifying properties, comprising components (A), (B) and (C), wherein:

A=a partial glyceride, containing at least one fatty acid residue with at least 2 carbon atoms B=a phospholipid and C=a long chain alcohol having at least 20 carbon atoms in the alcohol chain, while (A), (B) and (C) are present in amounts, based on the total emulsifier blend of:

0–90 wt % of (A), preferably 2–60 wt %, most preferably 10–40 wt %.

0–80 wt % of (B), preferably 2–60 wt %, most preferably 10–40 wt %

0.01–99.98 wt % of (C), preferably 2–70 wt %, most preferably 10–60 wt %, and the total amount of components (A) and (B) in this blend always being at least 0.02 wt %.

DETAILED DESCRIPTION OF THE INVENTION

In above emulsifier blends component (A) is selected from the group consisting of saturated and unsaturated monoglycerides, saturated or unsaturated or mixed diglycerides, or mixtures thereof with emulsifying properties.

Very convenient products are based on partial glycerides derived from saturated fatty acids with 2–22 carbon atoms in particular 8–18 carbon atoms, most preferably 16–18 carbon atoms. However partial glycerides based on mono or polyunsaturated fatty acid residues can be used successfully as well. In particular partial glycerides derived from oleic acid and linoleic acid perform well.

Component (B) of above blends can be selected from the group consisting of lecithin, enzymically treated lecithin, fractions of lecithin. The enzymically treated lecithin preferably is a lecithin treated with phospholipase A and/or D. Also fractions of lecithin can be used successfully eg a fraction obtained after ethanol extraction performs very good. Component (C) is the healthy component in above emulsifier blends. This component is preferably a straight chain alcohol with more than 20 carbon atoms, in particular having 26–30 C atoms.

The health benefits of these components (C) are disclosed in the two documents referred to earlier. However the positive impact on the structuring properties of the blend is not disclosed therein. This component is present in a number of natural products such as wheatgerm-wax, carnauba-wax, rice bran wax and sugar cane wax. Commercial products, containing these can be obtained from eg Garuda, Int or Dalmar Lab and are known as Octacosanol®, Ateromixol®.

Thus fat-continuous emulsions of fat and water having a fat content of 0.5–99.5 wt %, preferably 10–90 wt %, most preferably 15–85 wt % and containing an emulsifier system, wherein the emulsifier system is a blend as disclosed above are part of our invention. These emulsions contain the emulsifier blend according to the invention in amounts such that the ratio fat: emulsifier blend in the emulsion ranges from 99.9:0.1 to 90:10.

Preferred fats that are applied in our emulsions are fats that display a solid fat content (measured by NMR on a non stabilised fat) at 5° C. (=N5)of >10, preferably >20 and at 35° C. (=N35) <7, preferably <3. The solid fat content is measured on a fat that was subjected to the following T-regime:melt at 80° C., cool to 0° C. and keep it 1 hr at 0° C., warm up to measurement temperature and keep it at this temperature for half an hour.

Very suitable fats comprise at least two components (D) and (E) from which (D) has an N20>20 and (E) has a content mono and diunsaturated fatty acid residues of at least 25%, preferably at least 45%, in particular 45–70%. Herein component (D) can be selected from the group consisting of palm kernel fractions, palm fractions, interesterified mixtures thereof, interesterified hardened palm oil and hardened palm kernel oil and fractions thereof, interesterified mixtures of liquid oils and hardened liquid oils, and fractions thereof, fats containing at least 20 wt %, preferably at least 35 wt % of SUS triglycerides. Preferred fats D are interesterified palm oil fractions; interesterified mixtures of palm oil 58 and palm kernel 41, and its fractions, interesterified palm stearin/palm kernel stearin and its fractions and interesterified soybean oil/soybean oil 65 and its fractions. Component (E) suitably is selected from the group consisting of sunflower oil, high oleic sunflower oil, rape seed oil, high oleic rape seed oil, palm oil olein, corn oil, soybean oil, high oleic soybean oil.

The emulsions that are obtained are fat continuous and preferably do not contain water soluble emulsifiers, other than proteins.

The emulsions can also contain other ingredients eg proteins in particular proteins derived from milk. Another component that is useful for in particular achieving a structuring of the waterphase, in particular in those products that are low in fat content are thickeners. Useful thickeners can be selected from the group consisting of starch, modified starch, guar gum, carrageenan, locust bean gum and gelatin.

EXAMPLES I–III

Margarines and halvarines (protein based and water based) were made according to the recipe mentioned in tables I–III. The processing was performes as follows: A premix was made at 60° C. of the components given in the amounts indicated. The premix was processed in a system consisting of an A1, an A2 and a C2 unit, wherein A1 and A2 are two scraped surface heat exchanger whereas C1 was a resting unit in case a margarine was made and an inventor in case a halverine was made.

The hardness of the products was measured on a Stevens texture analyser provided with a probe of 6.35 mm under standard conditions.

The results are given in tables I–III. It can be concluded that the products containing a policosanol were in general harder than the products without this component, although the total of (hymono+bolec+policosanol) was always 0.3%, except for the waterhalverines were this total was always 0.4%. The results also demonstrates that the effect was bigger the more policosanol was present.

I EFFECT of POLICOSANOL on PRODUCT PROPERTIES of MARGARINES

|  | 1A | 1B | 1C |
|---|---|---|---|
| Fat composition: | | | |
| in (65 mfPOs/35 PK) | 15.0 | 15.0 | 15.0 |
| SF | 85.0 | 85.0 | 85.0 |
| Blend composition: | | | |
| Fatblend | 79.55 | 79.55 | 79.55 |
| Hymono 8903 (=MG/DG) | 0.10 | 0.10 | 0.10 |
| Bolec Z (=Lecithin) | — | 0.10 | 0.20 |
| Policosanol | 0.20* | 0.10* | — |
| Carotene | 0.15 | 0.15 | 0.15 |
| Whey | 1.00 | 1.00 | 1.00 |
| Salt | 1.75 | 1.75 | 1.75 |
| K-Sorbate | 0.07 | 0.07 | 0.07 |
| Water | 17.18 | 17.18 | 17.18 |
| Processing: | | | |
| Capacity k/h | 5.5 | 5.5 | 5.5 |
| A1 rpm/Tex | 800/11 | 800/11 | 800/11 |
| A2 rpm/Tex | 800/8 | 800/8 | 800/8 |
| C1 (50 ml) rpm/Tex | 100/10 | 100/10 | 100/10 |
| Pressure (bar) | 2 | 2 | 2 |
| % solids NMR | 7.7 | 7.8 | 6.9 |
| Properties: | | | |
| Stevens values (6.35 mm) Storage 1 week at 5° C.: | | | |
| S 5 | 157 | 165 | 146 |
| S 10 | 174 | 155 | 146 |
| S 15 | 122 | 110 | 93 |
| S 20 | 82 | 72 | 61 |
| Storage 3 week at 5° C.: | | | |
| S 10 | 195 | 189 | 159 |
| S 20 | 57 | 44 | 42 |
| Storage at 20° | | | |
| 3 days at 20° C. ----> S 15 | 116 | 99 | 84 |
| Cycling | | | |
| 3 d cycle 5°/25° C. --> S 15 | 112 | 105 | 84 |

|  | 1D | 1E | 1F |
|---|---|---|---|
| Fat composition: | | | |
| in (65 mfPOs/35 PK) | 15.0 | 15.0 | 15.0 |
| SF | 85.0 | 85.0 | 85.0 |
| Blend composition: | | | |
| Fatblend | 79.55 | 79.55 | 79.55 |
| Hymono 8903 | 0.10 | 0.10 | 0.10 |
| Bolec Z | — | 0.10 | 0.20 |
| Policosanol | 0.20** | 0.10** | — |
| Carotene | 0.15 | 0.15 | 0.15 |
| Whey | 1.00 | 1.00 | 1.00 |
| Salt | 1.75 | 1.75 | 1.75 |
| K-Sorbate | 0.07 | 0.07 | 0.07 |
| Water | 17.18 | 17.18 | 17.18 |
| Processing: | | | |
| Capacity k/h | 5.5 | 5.5 | 5.5 |
| A1 rpm/Tex | 800/11 | 800/11 | 800/11 |
| A2 rpm/Tex | 800/8 | 800/8 | 800/8 |
| C1 (50 ml) rpm/Tex | 100/10 | 100/10 | 100/10 |
| Pressure (bar) | 2 | 2 | 2 |
| % solids NMR | 8.0 | 7.3 | 7.6 |
| Properties: | | | |
| Stevens values (6.35 mm) Storage 1 week at 5° C.: | | | |
| S 5 | 195 | 189 | 177 |
| S 10 | 193 | 180 | 151 |
| S 15 | 135 | 129 | 105 |
| S 20 | 91 | 82 | 59 |
| Storage 3 week at 5° C.: | | | |
| S 10 | 212 | 204 | 168 |
| S 20 | 65 | 55 | 42 |

I EFFECT of POLICOSANOL on PRODUCT PROPERTIES of MARGARINES

Storage at 20°

| | | | |
|---|---|---|---|
| 3 days at 20° C. ----> S 15 | 107 | 101 | 87 |

Cycling

| | | | |
|---|---|---|---|
| 3 d cycle 5°/25° C. --> S 15 | 133 | 122 | 95 |

| | 1G | 1H | 1I |
|---|---|---|---|
| Fat composition: | | | |
| in (65 mfPOs/35 PK) | 15.0 | 15.0 | 15.0 |
| SF | 85.0 | 85.0 | 85.0 |
| Blend composition: | | | |
| Fatblend | 79.55 | 79.55 | 79.55 |
| Hymono 8903 | 0.10 | 0.10 | 0.10 |
| Bolec Z | — | 0.10 | 0.20 |
| Policosanol | 0.20*** | 0.10*** | — |
| Carotene | 0.15 | 0.15 | 0.15 |
| Whey | 1.00 | 1.00 | 1.00 |
| Salt | 1.75 | 1.75 | 1.75 |
| K-Sorbate | 0.07 | 0.07 | 0.07 |
| Water | 17.18 | 17.18 | 17.18 |
| Processing: | | | |
| Capacity k/h | 5.5 | 5.5 | 5.5 |
| A1 rpm/Tex | 800/11 | 800/11 | 800/11 |
| A2 rpm/Tex | 800/8 | 800/8 | 800/8 |
| C1 (50 ml) rpm/Tex | 100/10 | 100/10 | 100/10 |
| Pressure (bar) | 2 | 2 | 2 |
| % solids NMR | 8.0 | 7.3 | 7.6 |
| Properties: | | | |
| Stevens values (6.35 mm) | | | |
| Storage 1 week at 5° C.: | | | |
| S 10 | 155 | 143 | 143 |
| S 15 | 114 | 94 | 89 |
| S 20 | 79 | 67 | 54 |
| Storage 3 week at 5° C.: | | | |
| S 10 | 180 | 157 | 143 |
| S 20 | 89 | 72 | 56 |
| Cycling | | | |
| 3 d cycle 5°/25° C. --> S 15 | 131 | 98 | 77 |

*from Garuda Int (>95 wt % alcohols with 24–34 C atoms; from which 60% is C28)
**from Carnauba-wax (>98% is $C_{24}$–$C_{34}$ - alcohol: from which 70% is $C_{32}$)
***from Sugar cane wax (97% is $C_{26}$–$C_{30}$ alcohols, from which 62% is $C_{28}$ alcohol)

II EFFECT of POLICOSANOL on PRODUCT PROPERTIES of PROTEIN HALVARINES

| | IIA | IIB | IIC |
|---|---|---|---|
| Fat composition: | | | |
| in (65 mfPOs/35 PK) | 17.0 | 17.0 | 17.0 |
| SF | 83.0 | 83.0 | 83.0 |
| Blend composition: | | | |
| Fatblend | 39.55 | 39.55 | 39.55 |
| Hymono 8903 | 0.20 | 0.20 | 0.20 |
| Bolec Z | — | 0.05 | 0.10 |
| Policosanol | 0.10* | 0.05* | — |
| Carotene | 0.15 | 0.15 | 0.15 |
| Gelatine | 2.50 | 2.50 | 2.50 |
| BMP | 0.83 | 0.83 | 0.83 |
| K-Sorbate | 0.10 | 0.10 | 0.10 |
| Salt | 1.65 | 1.65 | 1.65 |
| Water | 54.92 | 54.92 | 54.92 |
| Processing: | | | |
| Capacity k/h | 5.0 | 5.0 | 7.0 |
| A1 rpm/Tex | 800/25 | 800/25 | 800/25 |
| A2 rpm/Tex | 800/8 | 800/8 | 800/8 |
| C1 (50 ml) rpm/Tex | 1650/11 | 1650/11 | 1500/10 |
| Pressure bar | 2 | 2 | 2 |
| Properties: | | | |
| Stevens values: | | | |
| Storage 1 week at 5° C.: | | | |
| S 5 | 140 | 120 | 110 |
| S 10 | 157 | 153 | 125 |
| S 15 | 110 | 105 | 93 |
| S 20 | 59 | 53 | 49 |
| Storage 3 weeks at 5° C.: | | | |
| S 10 | 161 | 148 | 138 |
| S 20 | 63 | — | 46 |
| Storage at 20° | | | |
| 3 days at 20° C. ----> S 15 | 84 | 78 | 78 |
| Cycling: | | | |
| 3 d cycle 5°/25° C. --> S 15 | 97 | 84 | 82 |

| | IID | IIE | IIF |
|---|---|---|---|
| Fat composition: | | | |
| in (65 mfPOs/35 PK) | 17.0 | 17.0 | 17.0 |
| SF | 83.0 | 83.0 | 83.0 |
| Blend composition: | | | |
| Fatblend | 39.55 | 39.55 | 39.55 |
| Hymono 8903 | 0.20 | 0.20 | 0.20 |
| Bolec Z | — | 0.05 | 0.10 |
| Policosanol | 0.10** | 0.05** | — |
| Carotene | 0.15 | 0.15 | 0.15 |
| Gelatine | 2.50 | 2.50 | 2.50 |
| BMP | 0.83 | 0.83 | 0.83 |
| K-Sorbate | 0.10 | 0.10 | 0.10 |
| Salt | 1.65 | 1.65 | 1.65 |
| Water | 54.92 | 54.92 | 54.92 |
| Processing: | | | |
| Capacity k/h | 5.0 | 5.0 | 5.0 |
| A1 rpm/Tex | 800/25 | 800/25 | 800/25 |
| A2 rpm/Tex | 800/8 | 800/8 | 800/8 |
| C1 (50 ml) rpm/Tex | 1650/11 | 1650/11 | 1650/11 |
| Pressure (bar) | 2 | 2 | 2 |
| Properties: | | | |
| Stevens values: | | | |
| Storage 1 week at 5° C.: | | | |
| S 5 | 127 | 127 | 122 |
| S 10 | 159 | 148 | 137 |
| S 15 | 107 | 99 | 103 |
| S 20 | 61 | 51 | 53 |
| Storage 3 weeks at 5° C.: | | | |
| S 10 | 178 | 161 | 157 |
| S 20 | 55 | 49 | 44 |
| Storage at 20° | | | |
| 3 days at 20° C. ----> S 15 | 87 | 76 | 76 |
| Cycling: | | | |
| 3 d cycle 5°/25° C. --> S 15 | 80 | 91 | 80 |

II EFFECT of POLICOSANOL on PRODUCT PROPERTIES of PROTEIN HALVARINES (continued)

|  | IIG | IIH | III |
|---|---|---|---|
| Fat composition: | | | |
| in (65 mfPOs/35 PK) | 17.0 | 17.0 | 17.0 |
| SF | 83.0 | 83.0 | 83.0 |
| Blend composition: | | | |
| Fatblend | 39.55 | 39.55 | 39.55 |
| Hymono 8903 | 0.20 | 0.20 | 0.20 |
| Bolec Z | — | 0.05 | 0.10 |
| Policosanol | 0.10** | 0.05** | — |
| Carotene | 0.15 | 0.15 | 0.15 |
| Gelatine | 2.50 | 2.50 | 2.50 |
| BMP | 0.83 | 0.83 | 0.83 |
| K-Sorbate | 0.10 | 0.10 | 0.10 |
| Salt | 1.65 | 1.65 | 1.65 |
| Water | 54.92 | 54.92 | 54.92 |
| Processing: | | | |
| Capacity k/h | 5.0 | 5.0 | 5.0 |
| A1 rpm/Tex | 800/25 | 800/25 | 800/25 |
| A2 rpm/Tex | 800/8 | 800/8 | 800/8 |
| C1 (50 ml) rpm/Tex | 1650/11 | 1650/11 | 1650/11 |
| Pressure (bar) | 2 | 2 | 2 |
| Properties: | | | |
| Stevens values: | | | |
| Storage 1 week at 5° C.: | | | |
| S 5 | 191 | 164 | 170 |
| S 10 | 165 | 155 | 154 |
| S 15 | 130 | 121 | 116 |
| S 20 | 51 | 63 | 69 |
| Storage 3 weeks at 5° C.: | | | |
| S 10 | 170 | 171 | 156 |
| S 20 | 61 | 66 | 56 |
| Storage at 20° | | | |
| 3 days at 20° C. ----> S 15 | — | — | — |
| Cycling: | | | |
| 3 d cycle 5°/25° C. --> S 15 | 90 | 91 | 94 |

*from Garuda Int.
**from Carnauba-wax
***from Rice bran wax (>98% is $C_{24}$–$C_{34}$ alcohol, from which 78% is $C_{28}$–$C_{34}$)

III POLICOSANOL IN WATERHALVARINES

|  | IIIA | IIIB | IIIC |
|---|---|---|---|
| Fat Composition: | | | |
| in (65 mfPOs/35 PK) | 17.0 | 17.0 | 17.0 |
| SF | 83.0 | 83.0 | 83.0 |
| Blend composition: | | | |
| Fatblend | 39.45 | 39.45 | 39.45 |
| Hymono 4404 | 0.30 | 0.30 | 0.30 |
| Bolec Z | — | 0.05 | 0.10 |
| Policosanol*** | 0.10*** | 0.05*** | — |
| Carotene | 0.15 | 0.15 | 0.15 |
| Water | 60.0 | 60.0 | 60.0 |
| Processing: | | | |
| Capacity k/h | 7.0 | 7.0 | 7.0 |
| A1 rpm/Tex | 600/20 | 600/20 | 600/20 |
| A2 rpm/Tex | 600/10 | 600/10 | 600/10 |
| C1 (50 ml) rpm/Tex | 150/12 | 150/12 | 150/12 |
| Properties: | | | |
| Stevens values: | | | |
| Storage 1 week at 5° C.: | | | |
| S 5 | 102 | 92 | 98 |
| S 10 | 123 | 126 | 114 |
| S 15 | 105 | 107 | 96 |
| S 20 | 71 | 64 | 57 |
| Storage 3 weeks at 5° C. | | | |
| S 10 | 151 | 139 | 132 |
| S 20 | 65 | 58 | 52 |
| Cycling: | | | |
| 3 d cycle 5°/25° C. --> S15 | 98 | 73 | 66 |

***from Garuda Int.

What is claimed is:

1. Fat continuous emulsion of fat and water having a fat content of 0.5–99.5 wt % and containing an emulsifier system, wherein the emulsifier system is a blend of components with emulsifying properties, comprising components (A), (B) and (C), wherein:
    A=a partial glyceride, containing at least one fatty acid residue with at least 2 carbon atoms;
    B=a phospholipid; and
    C=a long chain alcohol having at least 20 carbon atoms in the alcohol chain, with (A), (B) and (C) present in amounts, based on the total emulsifier blend, of:
    0–90 wt % of (A)
    0–80 wt % of (B) and
    0.01–99.98 wt % of (C), the total amount of components (A) and (B) in said blend always being at least 0.02 wt %
    wherein the fat of the fat-continuous emulsion displays a solid fat content (measured by NMR on a non-stabilised fat) at 5° C. (=N5) of >10 and at 35° C. (=N35)<7.

2. The fat continuous emulsion of claim 1 wherein the fat displays a solid fat content at 5° C. of >20 and <3 at 35° C.

3. Fat continuous emulsion of fat and water having a fat content of 0.5–99.5 wt % and containing an emulsifier system, wherein the emulsifier system is a blend of components with emulsifying properties, comprising components (A), (B) and (C), wherein:
    A=a partial glyceride, containing at least one fatty acid residue with at least 2 carbon atoms;
    B=a phospholipid; and
    C=a long chain alcohol having at least 20 carbon atoms in the alcohol chain, with (A), (B) and (C) present in amounts, based on the total emulsifier blend, of:
    0–90 wt % of (A)
    0–80 wt % of (B) and
    0.01–99.98 wt % of (C), the total amount of components (A) and (B) in said blend always being at least 0.02 wt %
    wherein the fat comprises at least two components (D) and (E) from which (D) has an N20>20 and (E) has a content of mono- and di-unsaturated fatty acid residues of at least 25%.

4. Fat-continuous emulsion according to claim 3, wherein component (D) is selected from the group consisting of palm fractions, interesterified hardened palm oil and hardened palm kernel oil and fractions thereof, interesterified mixtures of liquid oils and hardened liquid oils, and fractions thereof, and fats containing at least 20 wt %, of SUS triglycerides.

5. Fat-continuous emulsion according to claim 3, wherein component (E) is selected from the group consisting of sunflower oil, high oleic sunflower oil, rape seed oil, high oleic rape seed oil, palm oil olein, corn oil, soybean oil, high oleic soybean oil.

6. The fat continuous emulsion of claim 3 wherein (E) has a content of mono- and di-unsaturated fatty acid residues of 45–70%.

7. A fat continuous emulsion of fat and water having a fat content of 15–85 wt % and containing an emulsifier system, wherein the emulsifier system is a blend of components with emulsifying properties, comprising components (A), (B) and (C), wherein:
   A=a partial glyceride, containing at least one fatty acid residue with at least 2 carbon atoms;
   B=a phospholipid; and
   C=a long chain alcohol having at least 20 carbon atoms in the alcohol chain, with (A), (B) and (C) present in amounts, based on the total emulsifier blend, of:
   0–90 wt % of (A)
   0–80 wt % of (B) and
   0.01–99.98 wt % of (C), the total amount of components (A) and (B) in said blend always being at least 0.02 wt %.

8. A fat continuous emulsion of fat and water having a fat content of 0.5–99.5 wt % and containing an emulsifier system, wherein the emulsifier system is a blend of components with emulsifying properties, comprising components (A), (B) and (C), wherein:
   A=a partial glyceride, containing at least one fatty acid residue with at least 2 carbon atoms;
   B=a phospholipid; and
   C=a long chain alcohol having at least 20 carbon atoms in the alcohol chain, with (A), (B) and (C) present in amounts, based on the total emulsifier blend, of:
   10–40 wt % of (A)
   10–40 wt % of (B) and
   10–60 wt % of (C), the total amount of components (A) and (B) in said blend always being at least 0.02 wt %.

9. A fat continuous emulsion of fat and water having a fat content of 0.5–99.5 wt % and containing an emulsifier system, wherein the emulsifier system is a blend of components with emulsifying properties, comprising components (A), (B) and (C), wherein:
   A=a partial glyceride, containing at least one fatty acid residue with at least 2 carbon atoms;
   B=a phospholipid; and
   C=a long chain alcohol having at least 20 carbon atoms in the alcohol chain, with (A), (B) and (C) present in amounts, based on the total emulsifier blend, of:
   0–90 wt % of (A)
   0–80 wt % of (B) and
   0.01–99.98 wt % of (C), the total amount of components (A) and (B) in said blend always being at least 0.02 wt %, said component (C) being a straight chain alcohol of 26–30 C atoms.

* * * * *